(12) United States Patent
Hunt et al.

(10) Patent No.: US 8,687,978 B2
(45) Date of Patent: *Apr. 1, 2014

(54) OPTICAL NANOWIRE ANTENNA WITH DIRECTIONAL TRANSMISSION

(75) Inventors: Jeffrey H. Hunt, Thousand Oaks, CA (US); John Huntley Belk, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/324,235

(22) Filed: Dec. 13, 2011

(65) Prior Publication Data

US 2013/0147363 A1 Jun. 13, 2013

(51) Int. Cl.
*H04B 10/00* (2013.01)
*H04B 10/116* (2013.01)

(52) U.S. Cl.
CPC .................................... *H04B 10/116* (2013.01)
USPC .......................................... 398/172; 398/118

(58) Field of Classification Search
USPC ................................................. 398/118, 172
See application file for complete search history.

(56) References Cited

U.S. PATENT DOCUMENTS

| 7,633,081 | B2 * | 12/2009 | Bakkers et al. ................. 257/13 |
| 8,043,942 | B2 | 10/2011 | Lee et al. | |
| 8,390,005 | B2 | 3/2013 | Wang et al. | |
| 8,415,608 | B2 | 4/2013 | Hunt | |
| 2004/0112964 | A1 | 6/2004 | Empedocles et al. | |
| 2005/0253138 | A1 | 11/2005 | Choi et al. | |
| 2006/0182966 | A1 | 8/2006 | Lee et al. | |
| 2008/0192786 | A1 | 8/2008 | Bakkers et al. | |
| 2010/0155692 | A1 * | 6/2010 | Tran .................................. 257/9 |
| 2010/0327258 | A1 | 12/2010 | Lee et al. | |
| 2011/0100440 | A1 | 5/2011 | Schmidt et al. | |
| 2011/0297846 | A1 | 12/2011 | Wang | |
| 2013/0049041 | A1 | 2/2013 | Ramer et al. | |
| 2013/0146791 | A1 | 6/2013 | Hunt et al. | |

FOREIGN PATENT DOCUMENTS

WO WO03005450 A2 1/2003

OTHER PUBLICATIONS

U.S. Appl. No. 13/323,966, filed Dec. 13, 2011, Hunt et al.
U.S. Appl. No. 13/324,655, filed Dec. 13, 2011, Hunt et al.
Huber, et al., "Confinement Effects and Surface-Induced Charge Carriers in Bi Quantum Wires," Applied Physics Letters, Feb. 23, 2004, pp. 1326-1328, vol. 84, No. 8.
Heremans, et al., "Thermoelectric Power of Bismuth Nanocomposites," Physical Review Letters, May 27, 2002, pp. 216801-1 to 216801-4, vol. 88, No. 21.
Peleg, et al., "Omnistereo: Panoramic Stereo Imaging," IEEE Transactions on Pattern Analysis and Machine Intelligence, Mar. 2001, pp. 279-290, vol. 23, No. 3.

(Continued)

*Primary Examiner* — Dalzid Singh
(74) *Attorney, Agent, or Firm* — Yee & Associates, P.C.

(57) ABSTRACT

A method and apparatus comprising a signal generator and wires. The signal generator is configured to generate electrical signals. The electrical signals have amplitudes and first phases. The wires are connected to the signal generator. The wires are configured to emit photons having phases in response to receiving the electrical signals. The photons have frequencies based on the amplitudes of the electrical signals and second phases based on the first phases of the electrical signals. The first phases of the electrical signals are selected such that the photons have a desired radiation pattern.

20 Claims, 9 Drawing Sheets

(56) References Cited

OTHER PUBLICATIONS

EP search report dated Mar. 26, 2013 regarding application 12195486.1-1860, reference NAM/P124949EP00, applicant The Boeing Company, 5 pages.

Extended European Search Report, dated Mar. 26, 2013, regarding Application No. EP12195492.9, 6 pages.

Office Action, dated Jul. 23, 2013, regarding U.S. Appl. No. 13/323,966, 34 pages.

Notice of Allowance, dated Aug. 13, 2013, regarding U.S. Appl. No. 13/324,655, 23 pages.

* cited by examiner

OPTICAL NANOWIRE ANTENNA WITH DIRECTIONAL TRANSMISSION

CROSS-REFERENCE TO RELATED APPLICATIONS

This application is related to the following patent applications: entitled "Nanowire Antenna", Ser. No. 13/323,966; and entitled "Scanning Optical Nanowire Antenna", Ser. No. 13/324,655; filed even date hereof, assigned to the same assignee, and incorporated herein by reference.

BACKGROUND INFORMATION

1. Field

The present disclosure relates generally to antennas and, in particular, to antennas that generate electromagnetic radiation at frequencies of light.

2. Background

An antenna is an electrical device that converts electric currents into electromagnetic radiation. The electromagnetic radiation may have a wave-like behavior as the electromagnetic radiation travels through space. The electromagnetic radiation may have electric fields and magnetic field components. The electromagnetic radiation generated by antennas is typically in the form of radio waves. These radio waves are electromagnetic radiation with wavelengths longer than infrared light. The radio waves are used to transfer information between different devices.

In some cases, it may be desirable to send information using other frequencies. For example, light frequencies, such as infrared light, visible light, and other frequencies, may be desirable for use in transmitting information. Currently, information is transmitted using lasers. Lasers, however, have limitations, such as internal heating. The internal heating may be a limiting factor in the power and range of operation for laser-based communication systems using waves shorter than those for radio waves.

Therefore, it would be advantageous to have a method and apparatus that takes into account at least some of the issues discussed above as well as possibly other issues.

SUMMARY

In one advantageous embodiment, an apparatus comprises a signal generator and wires. The signal generator is configured to generate electrical signals. The electrical signals have amplitudes and first phases. The wires are connected to the signal generator. The wires are configured to emit photons having phases in response to receiving the electrical signals. The photons have frequencies based on the amplitudes of the electrical signals and second phases based on the first phases of the electrical signals. The first phases of the electrical signals are selected such that the photons have a desired radiation pattern.

In another advantageous embodiment, a method for transmitting photons is present. Electrical signals having amplitudes and first phases are generated. The electrical signals are sent to wires configured to emit the photons in response to receiving the electrical signals. The photons are emitted in response to receiving the electrical signals. The photons have frequencies based on the amplitudes of the electrical signals and second phases based on first phases of the electrical signals. The first phases of the electrical signals are selected such that the photons have a desired radiation pattern.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

The different advantageous embodiments recognize and take into account one or more considerations. For example, the different advantageous embodiments recognize and take into account that it would be desirable to have an antenna system that is capable of generating electromagnetic radiation having wavelengths shorter than those of radio waves. For example, the different advantageous embodiments recognize and take into account that it is desirable to have an antenna system that is capable of generating electromagnetic radiation having frequencies greater than that of radio waves. For example, the frequencies desired may be above $1 \times 10^3$ Hz. These frequencies may be infrared light, visible light, and/or other frequencies.

The different advantageous embodiments recognize and take into account that creating electromagnetic radiation that is coherent at frequencies of light may require optical sources that may be difficult to configure. For example, for coherent light in an infrared range, semiconductor materials may be used. The semiconductor materials, however, may be frequency inflexible. Dye-based lasers may be used, but the requirements for handling the chemicals for these lasers may be more difficult than desired.

The different advantageous embodiments also recognize and take into account that parametric oscillators may provide larger tuning capabilities but may be inefficient and require complex optical mechanical structures. Further, these types of systems also may lose efficiency at an undesired amount when higher power is used to generate electromagnetic radiation.

Thus, the advantageous embodiments provide an apparatus comprising a signal generator and a wire. The signal generator is configured to generate an electrical signal having an amplitude. The wire is connected to the signal generator. The wire is configured to emit photons in response to receiving the electrical signal, and the photons have a frequency based on the amplitude of the electrical signal. For example, an amplitude of voltage of an electrical signal is proportional to absorbed energy, which absorbed energy is proportional to a frequency of the photons.

Figure 1:
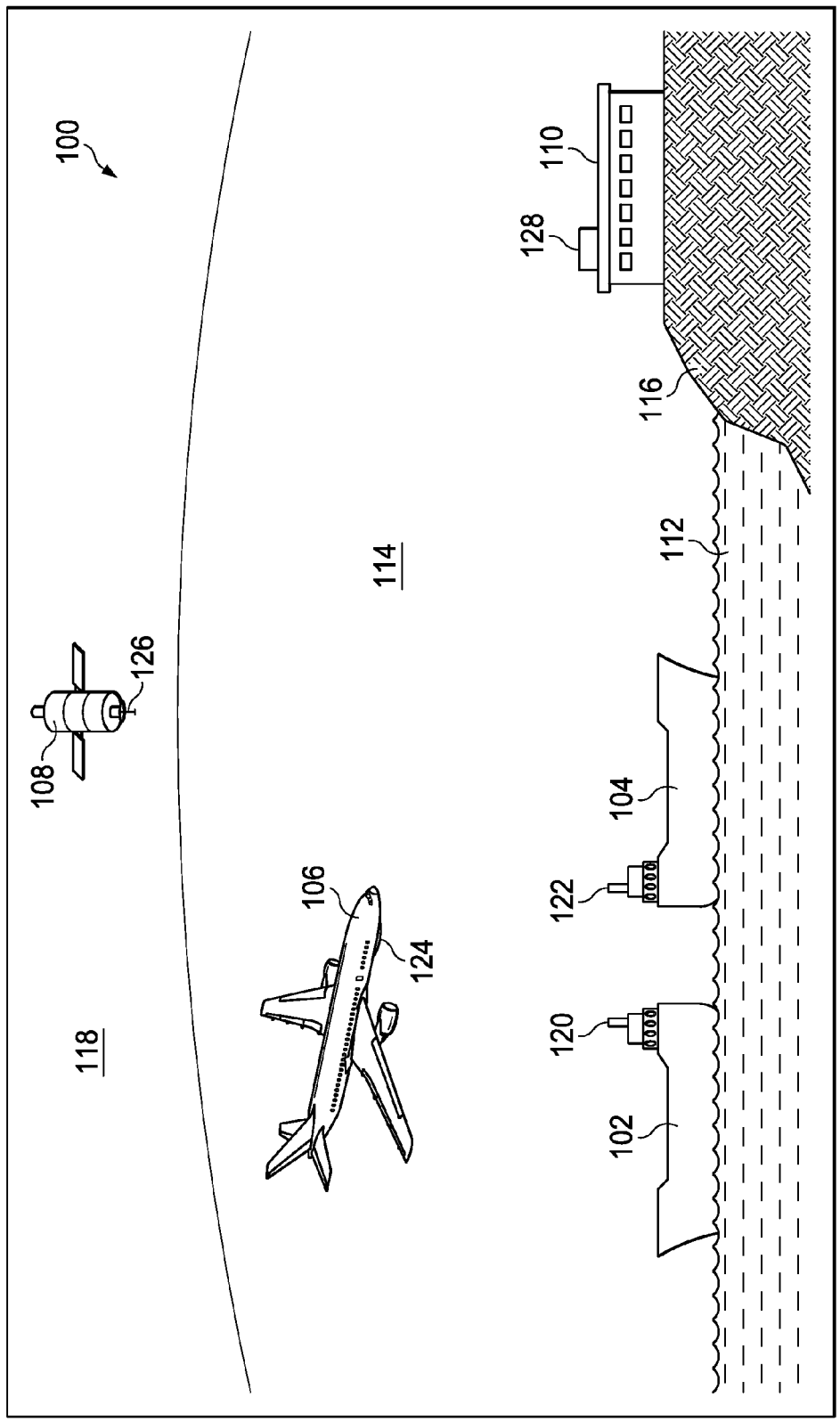
FIG. 1 is an illustration of an antenna environment in accordance with an advantageous embodiment.

With reference now to the figures and, in particular, with reference to FIG. 1, an illustration of an antenna environment is depicted in accordance with an advantageous embodiment. In this illustrative example, antenna environment 100 includes ship 102, ship 104, aircraft 106, satellite 108, and ground station 110. Ship 102 and ship 104 are on water 112. Aircraft 106 flies through air 114. Ground station 110 is located on ground 116, and satellite 108 is located in outer space 118.

In these illustrative examples, ship 102 has communications system 120, ship 104 has communications system 122, aircraft 106 has communications system 124, satellite 108 has communications system 126, and ground station 110 has communications system 128. In particular, these communications systems are configured to facilitate communication between ship 102, ship 104, aircraft 106, satellite 108, ground station 110, and/or some combination thereof.

Communications system 120, communications system 122, communications system 124, communications system 126, and communications system 128 may be implemented in accordance with an advantageous embodiment. In particular, these communications systems may employ electromagnetic signals in a frequency other than radio waves. For example, this frequency may be an optical frequency. The optical frequency may include, for example, without limitation, infrared light, visible light, and ultra-violet radiation. Non-optical frequency bands also may be used in communications system 120, communications system 122, communications system 124, communications system 126, and communications system 128 when these communications systems are implemented in accordance with an advantageous embodiment. An illustrative example of non-optical frequencies is terahertz frequencies, which are from about 300 GHz to about 3,000 GHz.

Figure 2:
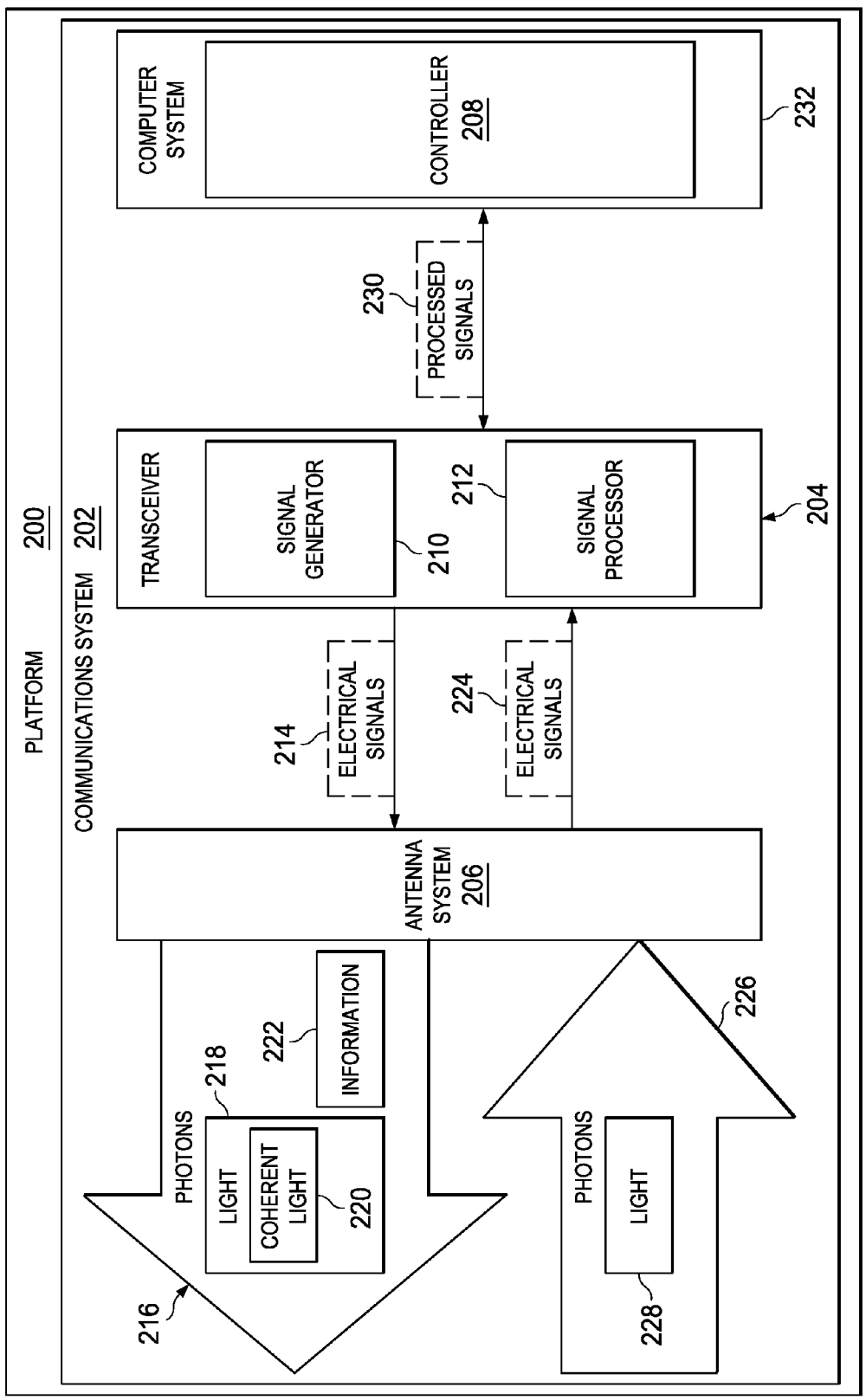
FIG. 2 is an illustration of a block diagram of a platform with a communications system in accordance with an advantageous embodiment.

Turning next to FIG. 2, an illustration of a block diagram of a platform with a communications system is depicted in accordance with an advantageous embodiment. Ship 102, ship 104, aircraft 106, satellite 108, and ground station 110 in FIG. 1 are examples of implementations for platform 200 in FIG. 2.

In this illustrative example, communications system 202 is associated with platform 200. As illustrated, communications system 202 includes transceiver 204, antenna system 206, and controller 208. Transceiver 204 may include signal generator 210 and signal processor 212. Signal generator 210 is configured to generate electrical signals 214. Electrical signals 214 are sent to antenna system 206. Electrical signals 214 are configured to cause antenna system 206 to generate photons 216 that form light 218. In these illustrative examples, light 218 may be coherent light 220. Information 222 is encoded in light 218 for transmission to another communications system.

In these illustrative examples, antenna system 206 is configured to generate electrical signals 224 when photons 226 for light 228 are received by antenna system 206. Electrical signals 224 are sent to signal processor 212 for processing. Thereafter, signal processor 212 may perform operations, such as filtering, demodulation, decoding, and other suitable operations, to form processed signals 230. Processed signals 230 may then be sent to controller 208.

In these illustrative examples, controller 208 controls the operation of signal generator 210 and signal processor 212 in transceiver 204. Controller 208 may be implemented using hardware, software, or a combination of the two. In these illustrative examples, controller 208 may be implemented in computer system 232. Computer system 232 is one or more computers. When computer system 232 comprises more than one computer, those computers may be in communication with each other using a medium, such as a network.

Further, hardware for controller 208 also may include a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices.

Figure 3:
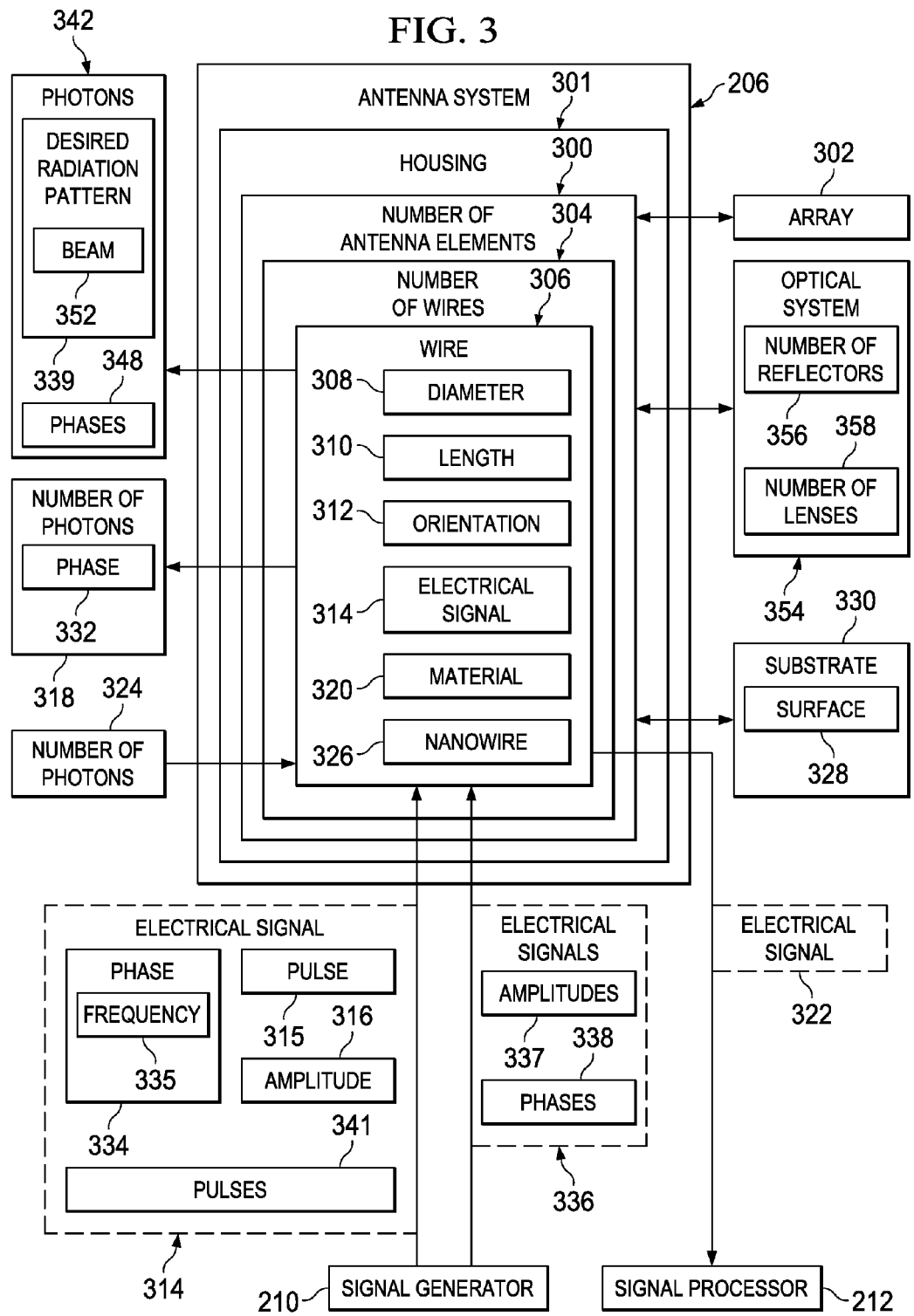
FIG. 3 is an illustration of a block diagram of an antenna system in accordance with an advantageous embodiment.

Turning now to FIG. 3, an illustration of a block diagram of an antenna system is depicted in accordance with an advantageous embodiment. In this illustrative example, examples of components that may be used in antenna system 206 in FIG. 2 are depicted.

In this illustrative example, antenna system 206 comprises number of antenna elements 300 in housing 301. A "number", as used herein with reference to items, means one or more items. For example, "number of antenna elements 300" means one or more antenna elements in these illustrative examples.

Number of antenna elements 300 may take the form of array 302. In these illustrative examples, number of antenna elements 300 and array 302 are evenly spaced with respect to each other. Number of antenna elements 300 may take the form of number of wires 304. In particular, each antenna element in number of antenna elements 300 may comprise a wire from number of wires 304. In these illustrative examples, wire 306 in number of wires 304 for number of antenna elements 300 may have diameter 308, length 310, and orientation 312.

In these illustrative examples, length 310 for wire 306 may vary. Length 310 may vary, depending on material 320 selected for wire 306. In these illustrative examples, wire 306 may be about at least 10 times the length of diameter 308. In one illustrative example, diameter 308 is up to about 10 nanometers.

Material 320 of wire 306 may be selected from at least one of a thermoelectric material, bismuth telluride, bismuth, silicon, bismuth-antimonide, and other suitable materials that provide desired properties for wire 306. As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

One property that is desired includes wire 306 generating number of photons 318 in response to receiving electrical signal 314 from signal generator 210. Another property is wire 306 generating electrical signal 322 in response to receiving number of photons 324. Electrical signal 322 is sent to signal processor 212. The reception of number of photons 318 may occur when receiving light containing communications from another communications system.

In this example, when number of photons 324 is absorbed by wire 306, electrical signal 322 is generated. In particular, electrical signal 322 has a voltage that is proportional to the energy in number of photons 324 absorbed by wire 306. With these properties, wire 306 is a thermal electrically active wire. In particular, wire 306 may take the form of nanowire 326 in these illustrative examples.

Orientation 312 of wire 306 is with respect to surface 328 of substrate 330. For example, orientation 312 of wire 306 or orientations of number of wires 304 may be substantially perpendicular to surface 328 of substrate 330, substantially parallel to surface 328 of substrate 330, or at some angle relative to surface 328 of substrate 330.

In these illustrative examples, signal generator 210 is configured to generate electrical signal 314 having amplitude 316. Electrical signal 314 is sent to wire 306 in number of wires 304. In response to receiving electrical signal 314, wire 306 is configured to emit number of photons 318. In particular, diameter 308 of wire 306 is selected to cause wire 306 to emit number of photons 318 in response to electrical signal 314 flowing through wire 306.

In this illustrative example, electrical signal 314 may take the form of pulse 315. Pulse 315 may have a duration that is long enough to cause wire 306 to emit number of photons 318. Pulse 315 may be, for example, about 100 nanoseconds or less. Pulse 315 may be selected to be a duration that is also short enough to avoid undesired heating in wire 306.

In these illustrative examples, in addition to generating number of photons 318, the generation of number of photons 318 may be controlled. The emission of number of photons 318 may have phase 332. Phase 332 for number of photons 318 is based on phase 334 of electrical signal 314. Thus, phase 334 of electrical signal 314 may be selected to control phase 332 of number of photons 318.

In these illustrative examples, phase 334 may be frequency 335 of electrical signal 314 received from signal generator 210. In these illustrative examples, signal generator 210 may send electrical signal 314 in the form of pulses 341. In these illustrative examples, phase 334 of electrical signal 314 is the timing or frequency of pulses 341 for electrical signal 314.

With the ability to control phase 332 of number of photons 318 emitted by wire 306, this control may be applied to number of wires 304. In this illustrative example, signal generator 210 may generate electrical signals 336 with amplitudes 337 and phases 338. Amplitudes 337 may be all of the same value for electrical signals 336.

Phases 338 for electrical signals 336 may be controlled in a manner to generate desired radiation pattern 339 for photons 342 emitted by wires within number of wires 304. For example, phases 338 for different signals in electrical signals 336 sent to number of wires 304 may be selected to be different from each other in a manner that generates desired radiation pattern 339 in a desired manner.

The selection of phases 338 for electrical signals 336 may be in a manner that generates desired radiation pattern 339 in a desired direction. In other words, photons 342 have phases 348 that may be used to generate a pattern of photons 342 to cause desired radiation pattern 339. In these illustrative examples, with different values for phases 348 in photons 342 emitted by number of wires 304, photons 342 having different phases may interact with each other. This interaction may be constructive, deconstructive, or a combination of the two. This interaction between photons 342 having different values for phases 348 results in desired radiation pattern 339. For example, desired radiation pattern 339 may be in the form of beam 352.

Further, electrical signals 336 may have phases 338 selected such that photons 342 with phases 348 may interact in a manner that causes desired radiation pattern 339 to move in different directions. This movement may be referred to as steering or scanning. For example, without limitation, beam 352 may be controlled to move in a direction, such as azimuth, elevation, or a combination of the two. This type of movement may be referred to as scanning or sweeping. Controlling of beam 352 may be performed in a manner similar to the control of a phased array antenna transmitting radio waves. In these illustrative examples, beam 352 may be, for example, without limitation, a beam of coherent light.

In addition, antenna system 206 also may include optical system 354. Optical system 354 may be configured to direct photons 342. In these illustrative examples, optical system 354 may comprise at least one of number of reflectors 356, number of lenses 358, and other suitable components. These components may be fixed or moveable, depending on the particular implementation.

The illustrations of communications system 202 in FIG. 2 and antenna system 206 in FIGS. 2 and 3 are not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, although communications system 202 is described as having transceiver 204, some illustrative examples may be implemented using a separate transmitter and receiver. Also, although optical system 354 is shown as part of antenna system 206, optical system 354 may be omitted in some illustrative examples. In some illustrative examples, controller 208 may be in a separate location from platform 200. Controller 208 may control other components in communications system 202 through a wireless communications link.

For example, one or more additional antenna systems in addition to antenna system 206 also may be present. These additional antenna systems may be controlled by controller 208.

Figure 4:
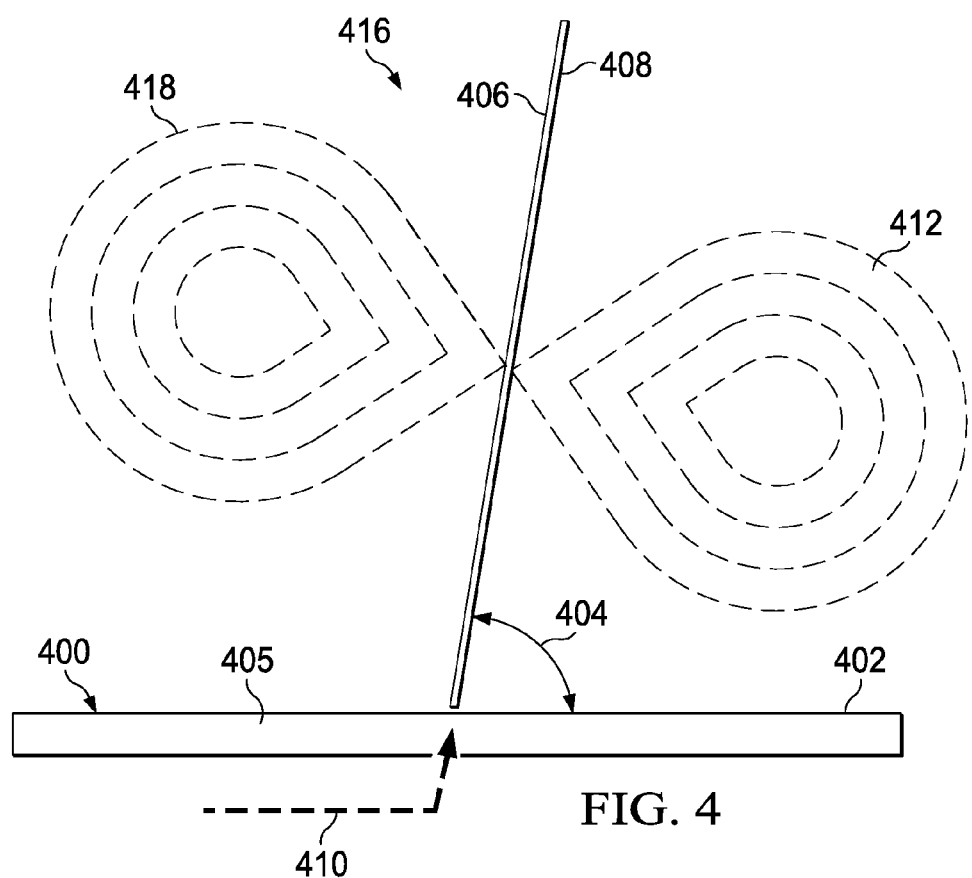
FIG. 4 is an illustration of an antenna in accordance with an advantageous embodiment.

With reference now to FIG. 4, an illustration of an antenna is depicted in accordance with an advantageous embodiment. In this illustrative example, antenna element 400 is an example of an implementation for number of antenna elements 300 in FIG. 3.

In this illustrative example, antenna element 400 is associated with substrate 402. Substrate 402 is configured to hold antenna element 400 in a desired orientation.

As depicted, antenna element 400 has angle 404 relative to surface 405 of substrate 402. Of course, in other illustrative examples, antenna element 400 may be substantially perpendicular to surface 405 or substantially parallel to surface 405. In this illustrative example, antenna element 400 takes the form of wire 406 and, in particular, is nanowire 408.

As illustrated in this example, electrical signal 410 causes photons 412 to be emitted from wire 406. As depicted, photons 412 have radiation pattern 416. Radiation pattern 416 is dipole radiation pattern 418 in this illustrative example.

Photons 412 in radiation pattern 416 have a desired frequency. This frequency is obtained without requiring additional control or modification. As discussed above, the frequency of photons 412 is based on an amplitude of electrical signal 410. In these illustrative examples, the frequency of photons 412 may be from about $1 \times 10^3$ Hz to about $3 \times 10^{17}$ Hz. Photons 412 may have other frequencies in other illustrative examples. In these illustrative examples, this frequency may be selected to obtain a desired wavelength for photons 412. The desired wavelength may be based on the location or media through which photons 412 are to be transmitted.

For example, if antenna element 400 is to be used underwater, shorter wavelengths of light may be desirable. In another example, if photons 412 have wavelengths for blue light, those wavelengths travel farther than others, such as those for red, yellow, and green light.

Figure 5:
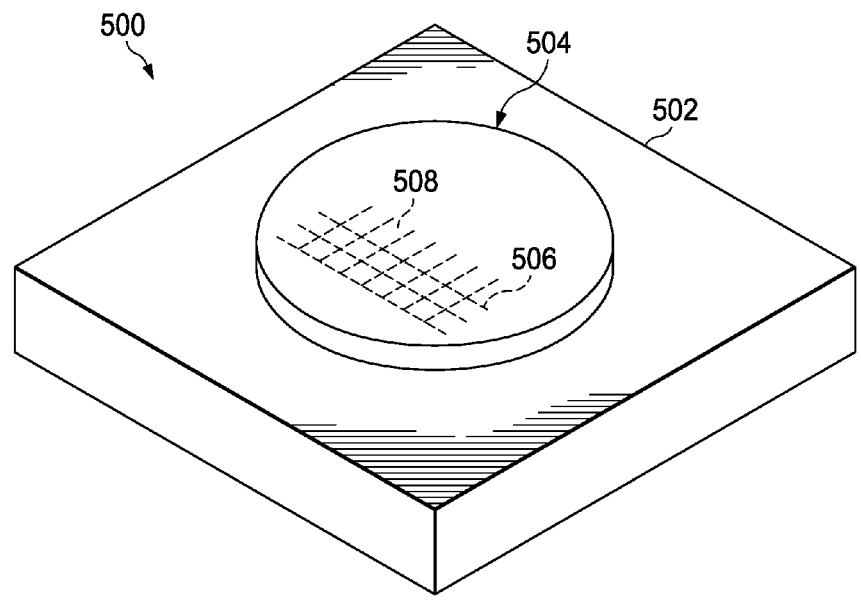
FIG. 5 is an illustration of an antenna system in accordance with an advantageous embodiment.

Turning now to FIG. 5, an illustration of an antenna system is depicted in accordance with an advantageous embodiment. In this depicted example, antenna system 500 is an example of one implementation for antenna system 206 shown in block form in FIG. 2. In this illustrative example, housing 502 for antenna system 500 has optical system 504.

Array 506 of antenna elements 508 is located within housing 502 under optical system 504. In this illustrative example, optical system 504 is configured to direct light transmitted by array 506 of antenna elements 508 as well as direct light to array 506 of antenna elements 508.

Figure 6:
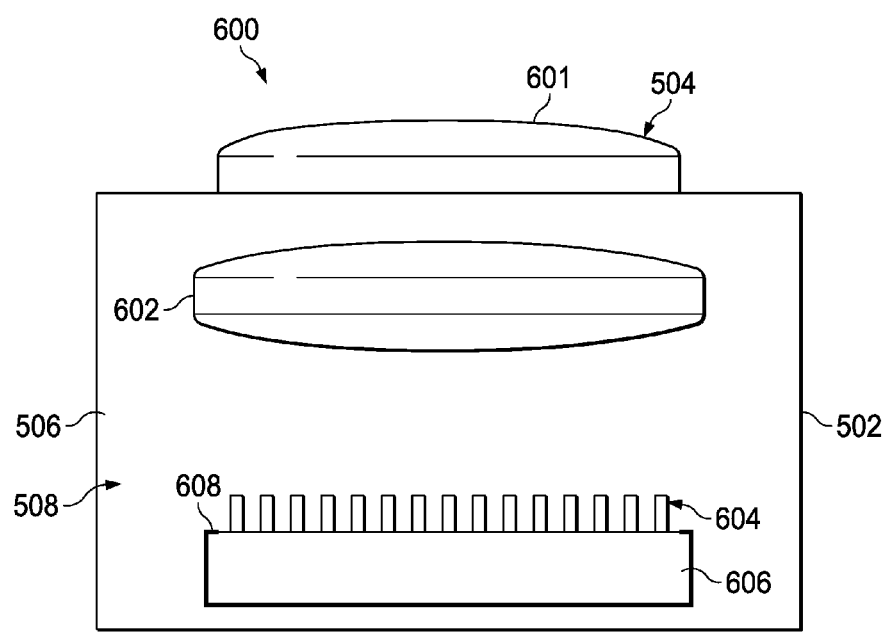
FIG. 6 is an illustration of an antenna system in accordance with an advantageous embodiment.

With reference now to FIG. 6, an illustration of an antenna system is depicted in accordance with an advantageous embodiment. In this illustrative example, antenna system 600 is an example of components that may be located in antenna system 500 in FIG. 5.

In this illustrative example, optical system 504 comprises lens 601 and lens 602. These lenses may direct light onto antenna elements 508 in array 506 or may aid in directing light emitted by antenna elements 508 in array 506 out of housing 502.

In this illustrative example, antenna elements 508 in array 506 take the form of wires 604. Wires 604 are associated with substrate 606. In this illustrative example, wires 604 are oriented to be substantially perpendicular to surface 608 of substrate 606.

Figure 7:
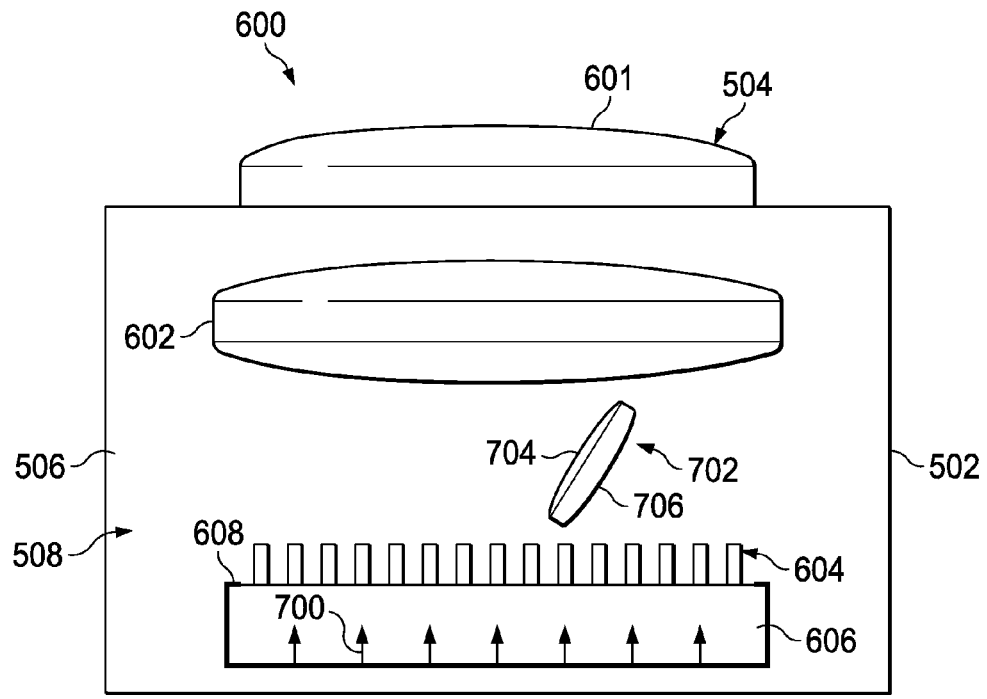
FIG. 7 is an illustration of the generation of a desired radiation pattern by an antenna system in accordance with an advantageous embodiment.

Turning now to FIG. 7, an illustration of the generation of a desired radiation pattern by an antenna system is depicted in accordance with an advantageous embodiment. In this illustrative example, electrical signals 700 are sent to wires 604 in a manner that generates desired radiation pattern 702.

The shape and direction of desired radiation pattern 702 may be controlled based on the phases of electrical signals 700. Different signals within electrical signals 700 may have different phases with respect to other electrical signals.

The selection of the phases for electrical signals 700 may result in constructive interference, destructive interference, or a combination of the two to form desired radiation pattern 702. In this illustrative example, desired radiation pattern 702 may be beam 704. Photons 706 in beam 704 may result in beam 704 being a beam of coherent light. In these illustrative examples, the frequency of photons 706 is selected based on the amplitude of electrical signals 700.

In one illustrative example, a wire in the array of wires has a diameter 308 configured to emit the photons 706 in response to receiving an electrical signal 314 in electrical signals 700 and photons 706 have a frequency 335 based on the amplitude in amplitudes of a voltage for electrical signal 314. In yet another example, the array of wires is configured to emit photons 706 in response to receiving the electrical signals 700 and the photons 706 have frequency 335 proportional to amplitudes of voltages of electrical signals 700.

Figure 8:
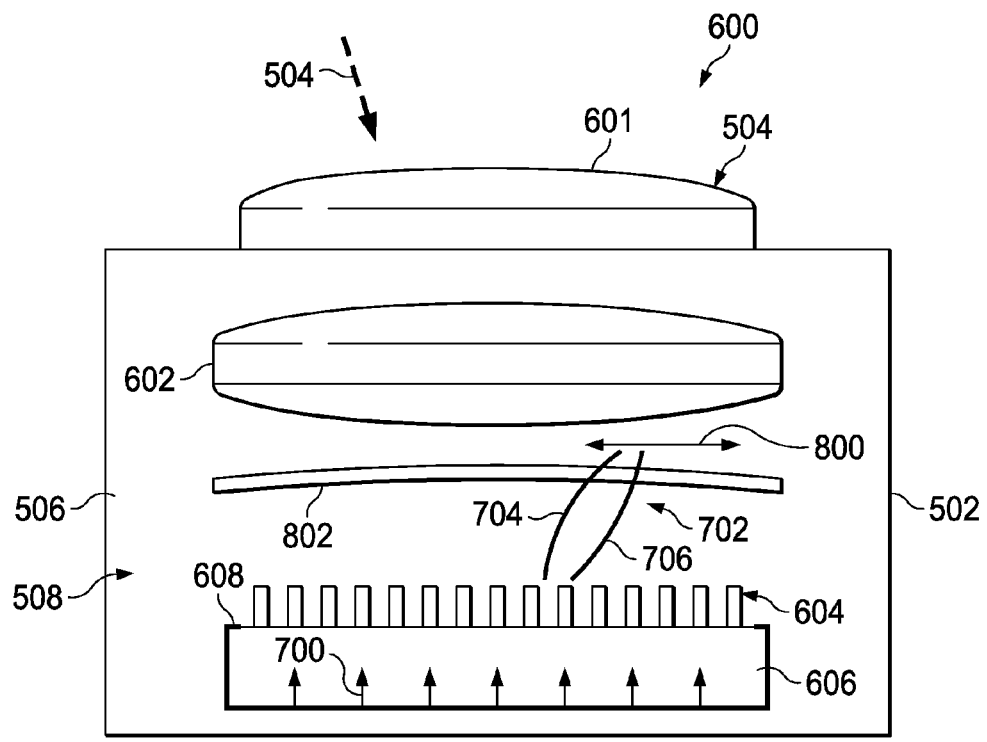
FIG. 8 is an illustration of moving a desired radiation pattern generated by an antenna system in accordance with an advantageous embodiment.

With reference now to FIG. 8, an illustration of moving a desired radiation pattern generated by an antenna system is depicted in accordance with an advantageous embodiment. Further, in addition to generating desired radiation pattern 702 in a desired shape, desired radiation pattern 702 may be moved in the direction of arrow 800. This movement of desired radiation pattern 702 may be referred to as steering. In these illustrative examples, desired radiation pattern 702 may be steered in arc 802, which occurs by controlling the phases of electrical signals 700. In this manner, desired radiation pattern 702 of photons 706 may be controlled in a manner similar to a phased array antenna that transmits radiation in the form of radio waves.

Desired radiation pattern 702 may be received by an antenna system similar to antenna system 600. Photons 706 in desired radiation pattern 702 may cause electrical signals to be generated in which the electrical signals may be processed to obtain information that may be encoded.

In another illustrative example, photons 706 in desired radiation pattern 702 may be detected by a semiconductor photodiode in the receiving system. The photodiode absorbs photons and generates an electrical signal that may be processed to identify information that may be encoded.

The different components illustrated in FIG. 1 and FIGS. 4-8 may be combined with components in FIG. 2 and FIG. 3, used with components in FIG. 2 and FIG. 3, or a combination of the two. Additionally, some of the components in FIG. 1 and FIGS. 4-8 may be illustrative of how components shown in block form in FIG. 2 and FIG. 3 may be implemented in physical structures.

In the illustrative examples, antenna system 206 may be used to provide communications between various platforms, such as those illustrated in FIG. 1. Although the platforms illustrated in FIG. 1 take the form of a ship, an aircraft, a satellite, and a ground station, the different advantageous embodiments may be applied to implement communications systems in other types of platforms.

For example, without limitation, other advantageous embodiments may be applied to a mobile platform, a stationary platform, a land-based structure, an aquatic-based structure, a space-based structure, and some other suitable platform. More specifically, the different advantageous embodiments may be applied to, for example, without limitation, a submarine, a ground vehicle, a bus, a personnel carrier, a tank, a train, an automobile, a spacecraft, a space station, a building, a surface ship, and some other suitable platform.

Figure 9:
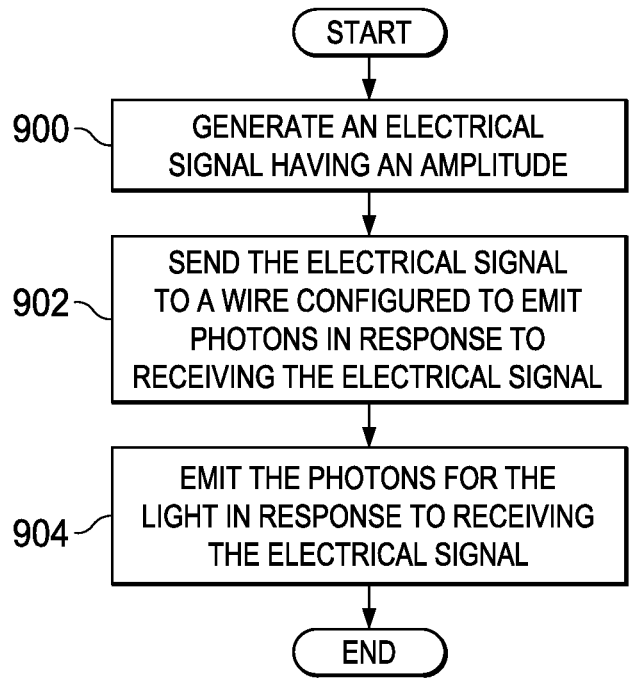
FIG. 9 is an illustration of a flowchart of a process for transmitting light in accordance with an advantageous embodiment.

With reference now to FIG. 9, an illustration of a flowchart of a process for transmitting light is depicted in accordance with an advantageous embodiment. The process illustrated in FIG. 9 may be implemented in antenna environment 100 in FIG. 1. In particular, the process may be implemented using communications system 202 in FIG. 2.

The process begins by generating an electrical signal having an amplitude (operation 900). The process sends the electrical signal to a wire configured to emit photons in response to receiving the electrical signal (operation 902). The photons are emitted for the light in response to receiving the electrical signal (operation 904), with the process terminating thereafter. In these illustrative examples, the photons have a frequency based on the amplitude of the electrical signal.

Figure 10:
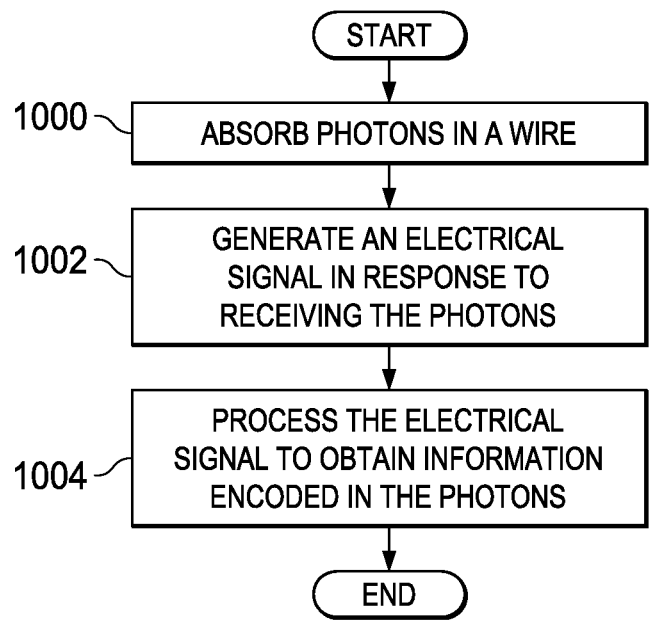
FIG. 10 is an illustration of a flowchart of a process for receiving light in accordance with an advantageous embodiment.

Turning next to FIG. 10, an illustration of a flowchart of a process for receiving light is depicted in accordance with an advantageous embodiment. This process may be implemented in antenna environment 100 in FIG. 1. In particular, the process may be implemented using communications system 202 in FIG. 2.

The process begins by absorbing photons in a wire (operation 1000). The electrical wire generates an electrical signal in response to receiving the photons (operation 1002). The electrical signal is processed to obtain information encoded in the photons (operation 1004), with the process terminating thereafter.

Figure 11:
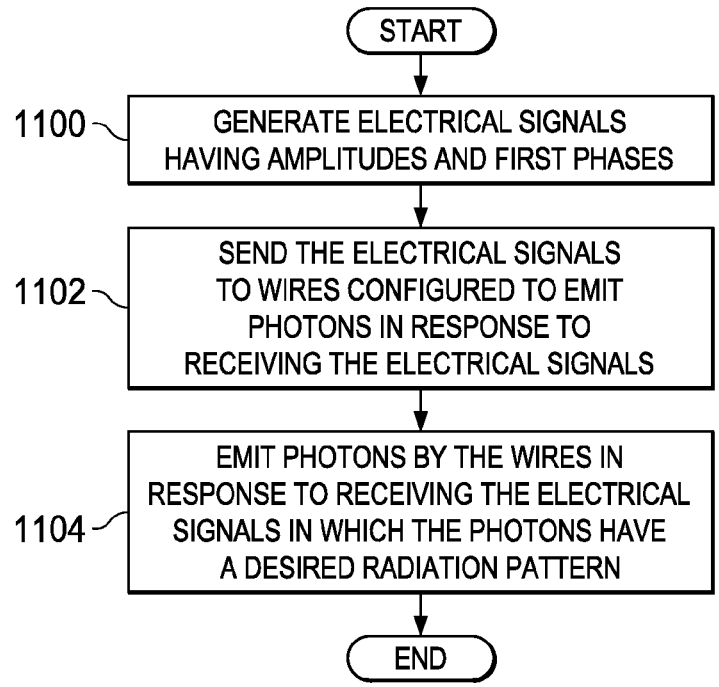
FIG. 11 is an illustration of a flowchart of a process for controlling transmission of photons in accordance with an advantageous embodiment.

Turning next to FIG. 11, an illustration of a flowchart of a process for controlling transmission of photons is depicted in accordance with an advantageous embodiment. The process in FIG. 11 may be implemented in antenna environment 100 in FIG. 1. In particular, this process may be implemented using communications system 202 in FIG. 2.

The process begins by generating electrical signals having amplitudes and first phases (operation 1100). The process sends the electrical signals to wires configured to emit photons in response to receiving the electrical signals (operation 1102).

Photons are emitted by the wires in response to receiving the electrical signals in which the photons have a desired radiation pattern (operation 1104), with the process terminating thereafter. In operation 1104, the photons have a frequency based on the amplitude of the electrical signals. The photons have second phases based on the first phases of the electrical signals. The phases of the electrical signals are selected such that the photons have the desired radiation pattern.

Figure 12:
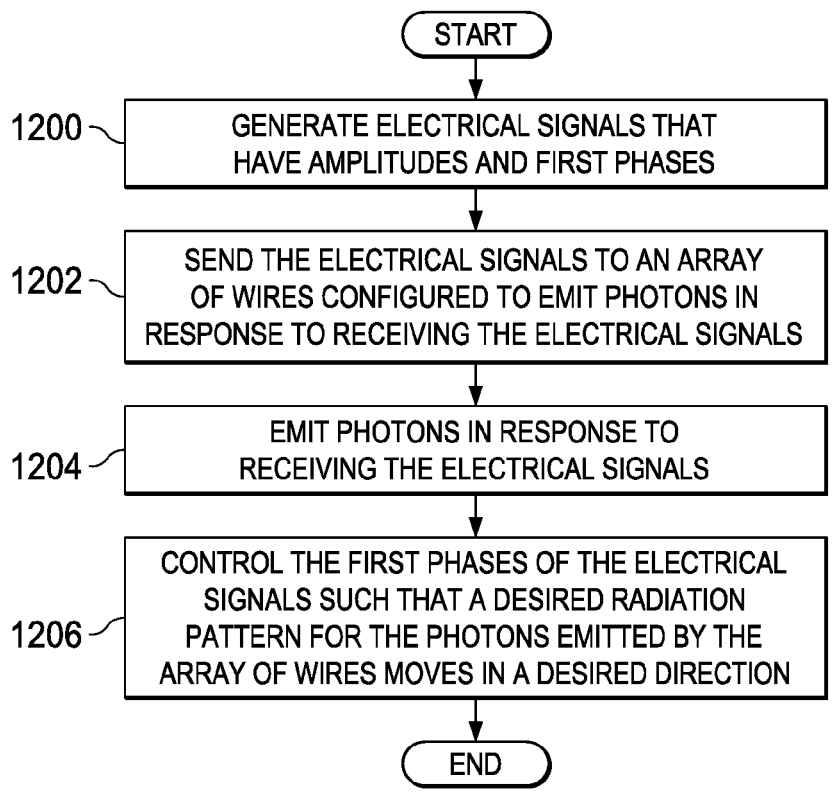
FIG. 12 is an illustration of a flowchart of a process for steering photons in accordance with an advantageous embodiment.

Turning next to FIG. 12, an illustration of a flowchart of a process for steering photons is depicted in accordance with an advantageous embodiment. The process in FIG. 12 may be implemented in antenna environment 100 in FIG. 1. In particular, this process may be implemented using communications system 202 in FIG. 2.

The process begins by generating electrical signals that have amplitudes and first phases (operation 1200). The process sends the electrical signals to an array of wires configured to emit photons in response to receiving the electrical signals (operation 1202).

Photons are emitted in response to receiving the electrical signals (operation 1204). The photons have a frequency based on the amplitude of the electrical signals. The second phases of the electrical signals are based on the first phases of the photons. The process controls the first phases of the electrical signals such that a desired radiation pattern for the photons emitted by the array of wires moves in a desired direction (operation 1206), with the process terminating thereafter.

In operation 1206, the controlling of the first phases of the electrical signals occurs in a manner that the photons with the second phases interact with each other to form the desired radiation pattern. When the second phases are different for photons emitted from different wires in the array of wires, constructive interference and destructive interference may occur to result in the desired radiation pattern and in movement in a desired direction.

Figure 13:
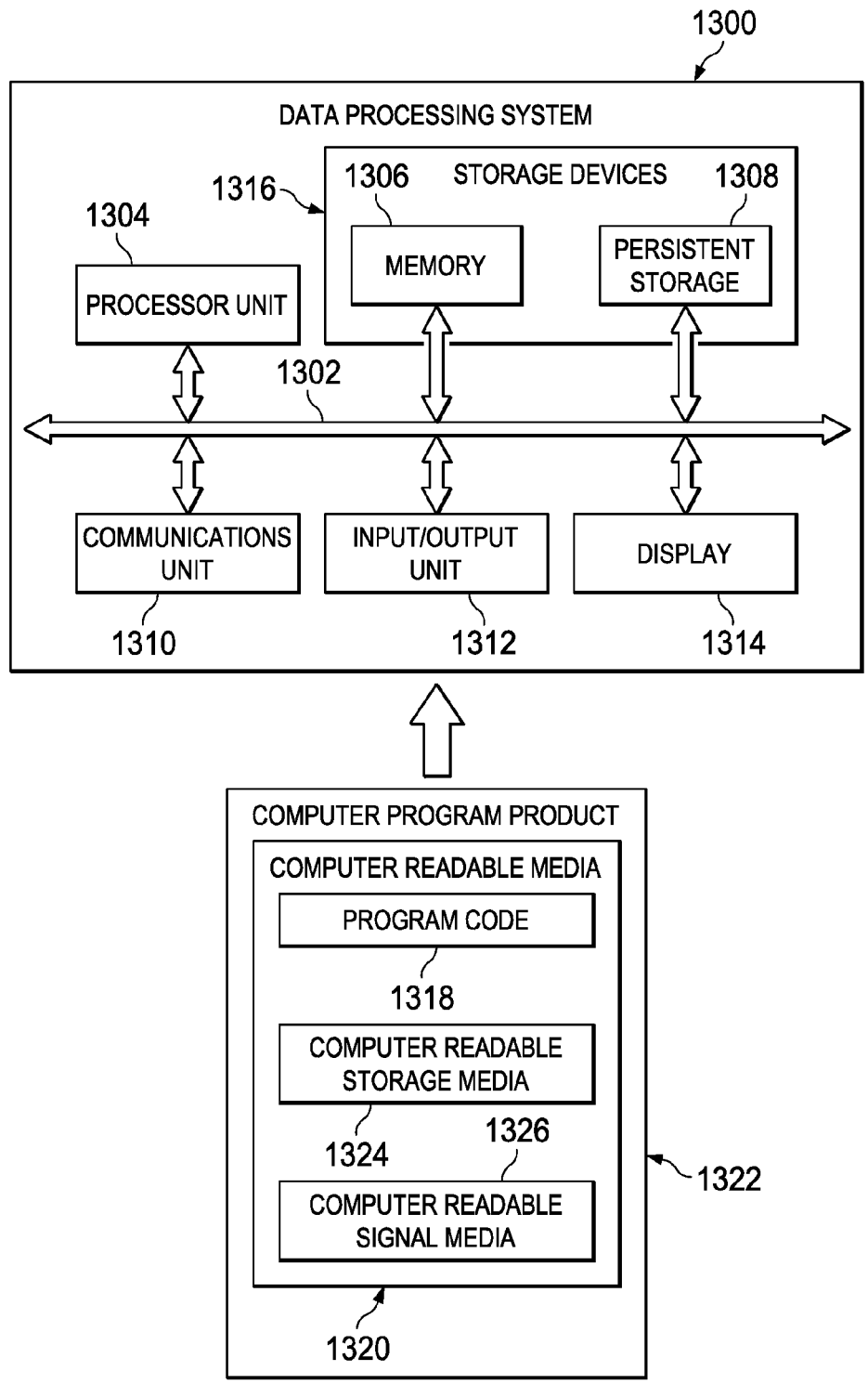
FIG. 13 is an illustration of a data processing system in accordance with an advantageous embodiment.

Turning now to FIG. 13, an illustration of a data processing system is depicted in accordance with an advantageous embodiment. Data processing system 1300 may be used to implement controller 208 and one or more computers in computer system 232 in FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, data, program code in functional form, and other suitable information. Storage devices 1316 also may be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1300 are not meant to provide physical or architectural limitations to the manner in which different embodiments may be implemented. The different advantageous embodiments may be implemented in a data processing system including components in addition to and/or in place of those illustrated for data processing system 1300. Other components shown in FIG. 13 can be varied from the illustrative examples shown. The different advantageous embodiments may be implemented using any hardware device or system capable of running program code 1318.

Thus, with one or more advantageous embodiments, communications may be enabled using antennas that emit and absorb photons and light. This type of antenna system avoids complexities of parametric oscillators and heat issues associated with lasers. Further, with the different advantageous embodiments, at least one of the frequency, the radiation pattern, and the direction of propagation of the radiation pattern may be controlled electronically through electrical signals. With the use of wires that are configured to absorb photons, generate electrical signals, and emit photons in response to receiving electrical signals, antennas that transmit and receive communications using photons may be implemented in a manner that allows for the control of the emission and absorption of photons.

The description of the different advantageous embodiments has been presented for purposes of illustration and description and is not intended to be exhaustive or limited to the embodiments in the form disclosed. Many modifications and variations will be apparent to those of ordinary skill in the art.

For example, the illustrative examples have been described with respect to optical frequencies. Other advantageous embodiments may be applied to other frequencies other than optical frequencies. For example, antenna system 206 may be configured to transmit photons for other frequencies other than light. An example of other frequencies that may be used is the terahertz frequencies, which are from about 300 GHz to about 3,000 GHz. Of course, any frequency may be used in which a wire, such as a nanowire or other suitable wire, can transmit photons in response to receiving an electrical signal.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a signal generator configured to generate electrical signals, wherein the electrical signals have amplitudes and first phases; and
wires connected to the signal generator, wherein the wires are configured to emit photons having phases in response to receiving the electrical signals and the photons have frequencies based on the amplitudes of the electrical signals and second phases based on the first phases of the electrical signals, wherein the first phases of the electrical signals are selected such that the photons have a desired radiation pattern.

2. The apparatus of claim 1, wherein the signal generator is configured to generate pulses of the electrical signals and wherein first phases of the pulses of the electrical signals comprise a timing of the pulses of the electrical signals.

3. The apparatus of claim 1, wherein the first phases of the electrical signals comprise frequencies of the electrical signals.

4. The apparatus of claim 1 further comprising:
a controller configured to control the first phases of the electrical signals such that the photons emitted from the wires interact with each other to form the desired radiation pattern.

5. The apparatus of claim 4, wherein the desired radiation pattern of the photons is a beam of light in a desired direction.

6. The apparatus of claim 1, wherein the wires have a diameter configured to emit the photons in response to receiving the electrical signals and the photons have a frequency based on amplitudes of a voltage for the electrical signals.

7. The apparatus of claim 1, wherein the wires are configured to emit the photons in response to receiving the electrical signals and the photons have a frequency proportional to amplitudes of a voltage of the electrical signals.

8. The apparatus of claim 1 further comprising:
an optical system configured to direct the photons.

9. The apparatus of claim 1 further comprising:
a substrate, wherein the wires are associated with the substrate, wherein the wires have orientations relative to the substrate that is selected from one of substantially perpendicular to a surface of the substrate, at an angle relative to the surface of the substrate, and substantially parallel to the surface of the substrate.

10. The apparatus of claim 1, wherein the wires have a diameter up to about 10 nanometers.

11. The apparatus of claim 1, wherein the wires are comprised of a material selected from one of a thermoelectric material, bismuth telluride, bismuth, silicon, and bismuth-antimonide.

12. The apparatus of claim 1, wherein the wires are nanowires.

13. The apparatus of claim 1 further comprising:
a platform selected from one of a mobile platform, a stationary platform, a land-based structure, an aquatic-based structure, a space-based structure, an aircraft, a surface ship, a ground vehicle, a tank, a personnel carrier, a train, a spacecraft, a space station, a satellite, a submarine, an automobile, and a building.

14. A method for transmitting photons, the method comprising:
generating electrical signals having amplitudes and first phases;
sending the electrical signals to wires configured to emit the photons in response to receiving the electrical signals; and
emitting the photons in response to receiving the electrical signals, wherein the photons have frequencies based on the amplitudes of the electrical signals and second phases based on the first phases of the electrical signals and wherein the first phases of the electrical signals are selected such that the photons have a desired radiation pattern.

15. The method of claim 14, wherein a signal generator is configured to generate pulses of the electrical signals and wherein first phases of the pulses of the electrical signals comprise a timing of the pulses of the electrical signals.

16. The method of claim 14, wherein the first phases of the electrical signals comprise frequencies of the electrical signals.

17. The method of claim 14 further comprising:
controlling the first phases of the electrical signals such that the photons emitted from the wires interact with each other to form the desired radiation pattern.

18. The method of claim 14, wherein the desired radiation pattern of the photons is a beam of coherent light in a desired direction.

19. The method of claim 14, wherein a wire in the wires has a diameter configured to emit a number of photons in response to receiving an electrical signal in the electrical signals and the number of photons has a frequency based on an amplitude in amplitudes of a voltage for the electrical signal.

20. The method of claim 14, wherein a wire in the wires is configured to emit a number of photons in response to receiving an electrical signal in the electrical signals and the photons have a frequency proportional to an amplitude in amplitudes of a voltage for the electrical signal.

* * * * *